(12) United States Patent
Dangel et al.

(10) Patent No.: US 7,672,560 B2
(45) Date of Patent: Mar. 2, 2010

(54) COUPLING DEVICE FOR USE IN OPTICAL WAVEGUIDES

(75) Inventors: Roger F. Dangel, Zug (CH); Folkert Horst, Zürich (CH); Tobias P. Lamprecht, Berneck (CH); Bert Jan Offrein, Schoenenberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/119,748

(22) Filed: May 13, 2008

(65) Prior Publication Data

US 2009/0284684 A1    Nov. 19, 2009

(51) Int. Cl.
| | |
|---|---|
| G02B 6/00 | (2006.01) |
| G02F 1/035 | (2006.01) |
| G02B 6/12 | (2006.01) |
| G02B 6/26 | (2006.01) |
| G02B 6/28 | (2006.01) |
| G02B 6/32 | (2006.01) |
| G02B 6/38 | (2006.01) |
| G02B 6/36 | (2006.01) |
| H01S 5/00 | (2006.01) |
| H01S 3/08 | (2006.01) |
| H01S 3/083 | (2006.01) |
| H01S 3/0382 | (2006.01) |

(52) U.S. Cl. ............... 385/132; 385/2; 385/11; 385/14; 385/15; 385/16; 385/24; 385/27; 385/28; 385/31; 385/33; 385/39; 385/50; 385/74; 385/88; 385/89; 385/129; 385/130; 385/131; 372/6; 372/46; 372/46.01; 372/50.1; 372/50.12; 372/92; 372/94; 372/97; 372/108; 359/332; 359/333; 359/334

(58) Field of Classification Search ................ 385/2, 385/11, 14–16, 24, 27, 28, 31, 33, 37, 39–50, 385/74, 88, 89, 129–132; 372/6, 46, 46.01, 372/50.1, 50.12, 92, 94, 97, 108; 359/332, 359/333, 334

See application file for complete search history.

(56) References Cited

U.S. PATENT DOCUMENTS

| | | | |
|---|---|---|---|
| 4,296,995 A * | 10/1981 | Bickel | ............ 385/47 |
| 5,078,512 A | 1/1992 | Ando | |
| 5,796,889 A * | 8/1998 | Xu et al. | .......... 385/24 |
| 6,207,351 B1 | 3/2001 | Cywar et al. | |
| 6,233,388 B1 | 5/2001 | Kim et al. | |
| 6,436,615 B1 | 8/2002 | Brandow et al. | |
| 6,852,152 B2 | 2/2005 | Galasco et al. | |
| 6,900,126 B2 | 5/2005 | Carter et al. | |
| 7,050,691 B2 | 5/2006 | Ishizaki et al. | |
| 2002/0051599 A1* | 5/2002 | Tsukamoto et al. | ......... 385/14 |
| 2004/0156576 A1 | 8/2004 | Windover | |
| 2006/0204176 A1 | 9/2006 | Kobayashi | |
| 2007/0258691 A1 | 11/2007 | Charters et al. | |

* cited by examiner

*Primary Examiner*—Charlie Peng
*Assistant Examiner*—Hung Lam
(74) *Attorney, Agent, or Firm*—Stephen C. Kaufman; Ryan, Mason & Lewis, LLP

(57) ABSTRACT

An optical coupling device for coupling light with an optical waveguide comprises a mirror formed within an optical waveguide. The mirror comprises a first material, a first reflective end, and a second reflective end. The first material is light conducting and has a first refractive index. The first and second reflective ends reflect and transmit light. The mirror has an axis line. The optical coupling device is useful for extracting light from a waveguide and providing a back-light for a liquid crystal display.

14 Claims, 5 Drawing Sheets

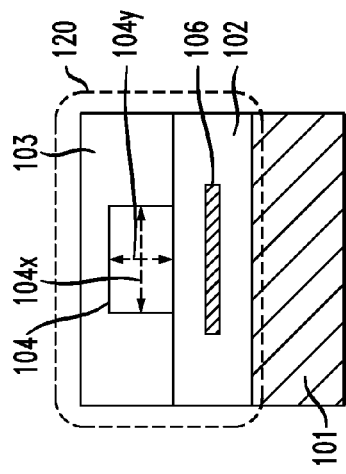
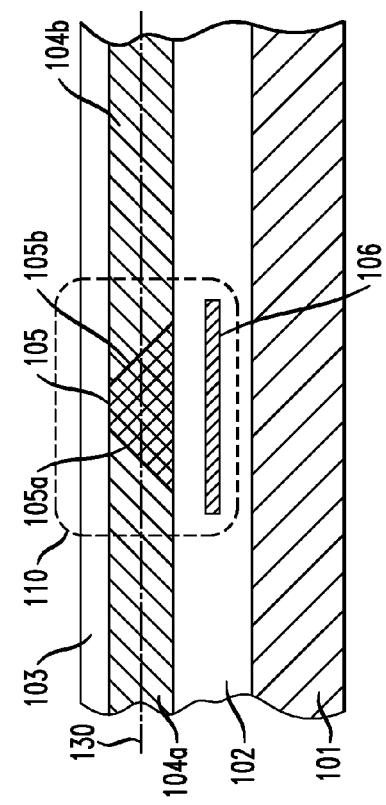
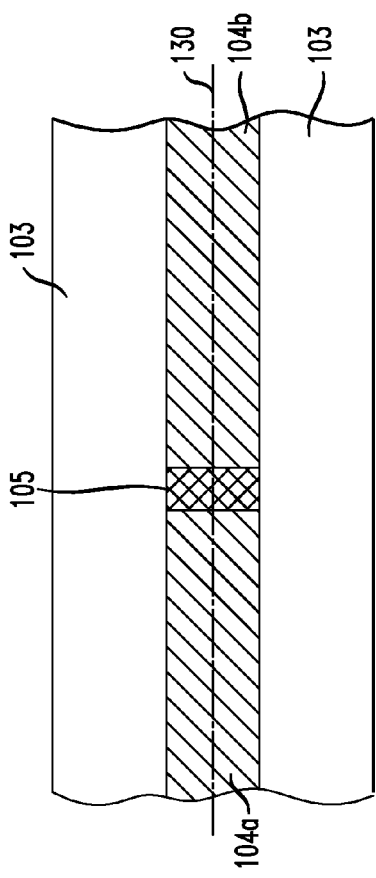

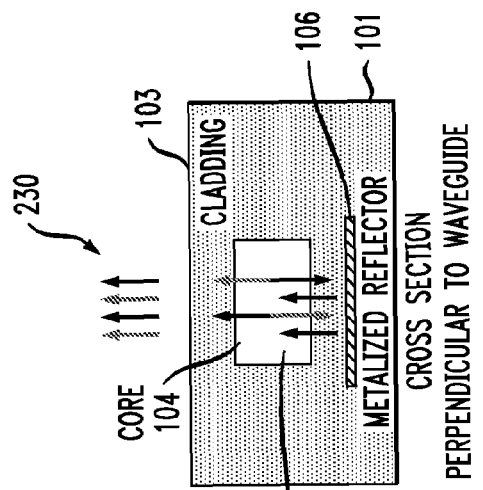
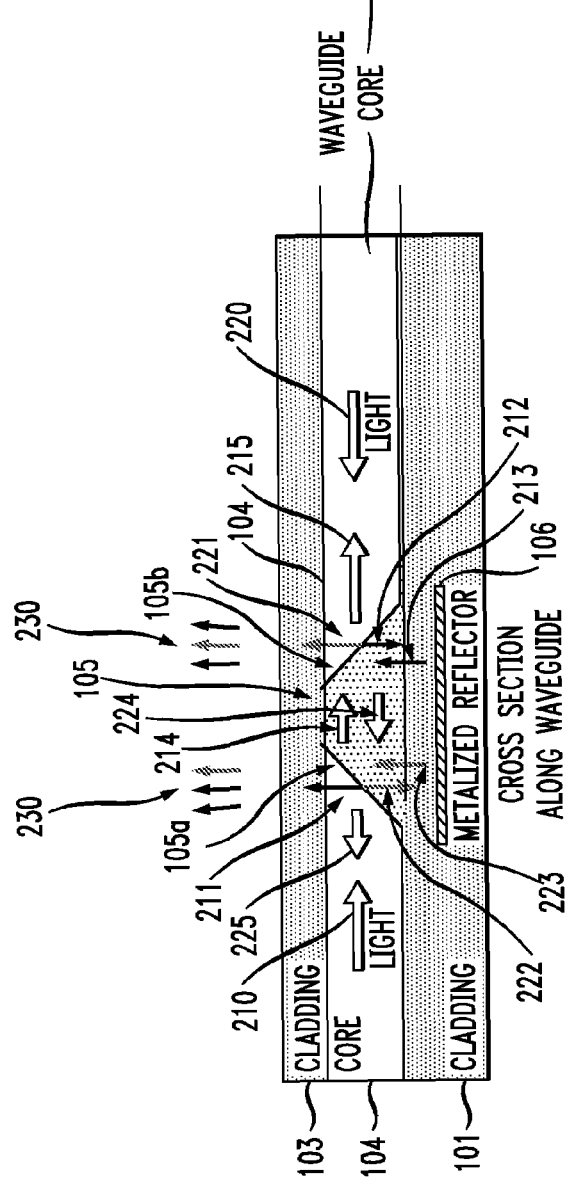

300

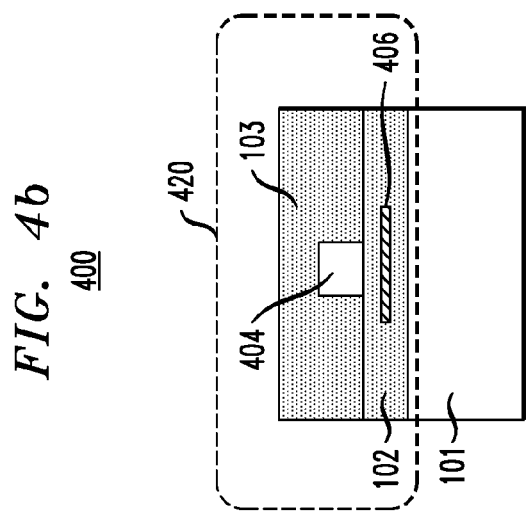
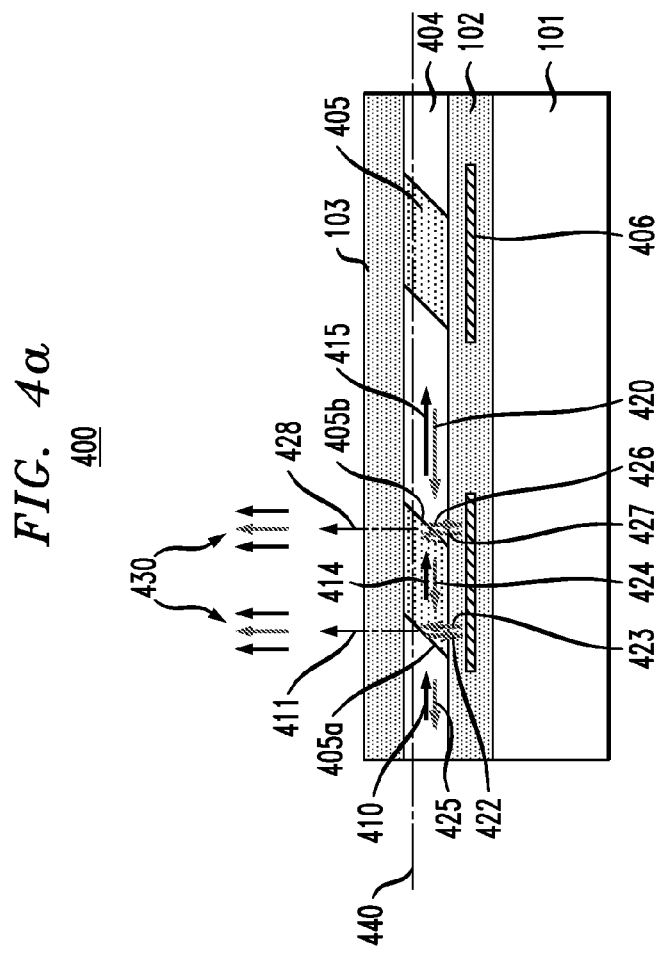

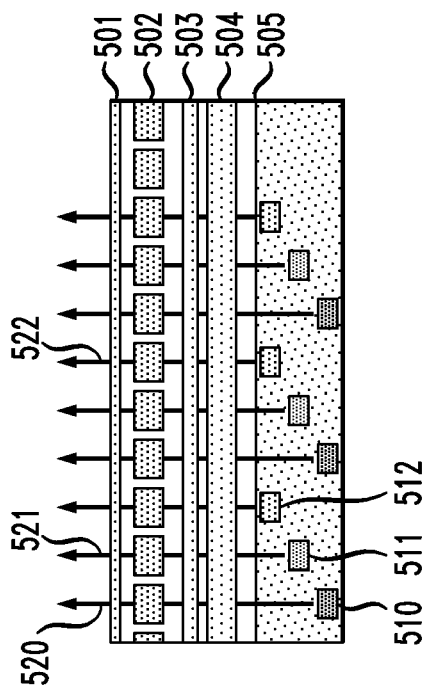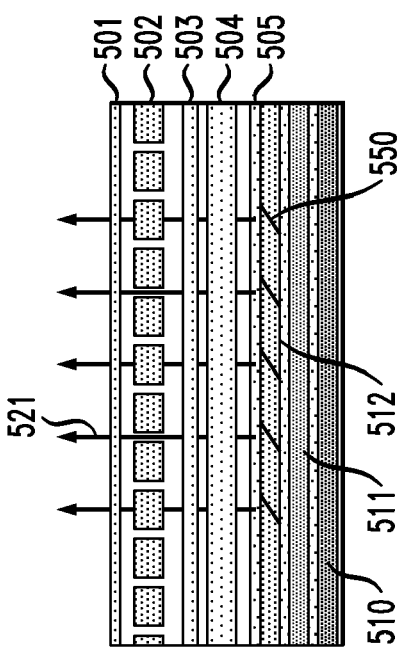

COUPLING DEVICE FOR USE IN OPTICAL WAVEGUIDES

FIELD OF THE INVENTION

The present invention relates generally to optical waveguides, and more particularly the invention relates to polymer optical waveguides and coupling devices to extract light from optical waveguides.

BACKGROUND OF THE INVENTION

Polymer optical waveguides are a promising approach to enable optical interconnects as a short reach communication platform for high-end servers and supercomputers. There are also several other potential application markets for polymer optical waveguides.

Known methods to fabricate optical interconnects are based on planar fabrication methods. For example, a lower cladding layer is deposited on a substrate. A core layer is deposited and patterned on the lower cladding layer. The core layer and lower cladding layer are covered with an upper cladding layer. Core and cladding layers are typically transparent, dielectric materials. The core layer has a different refractive index than the cladding layers. Several of these layers produce a multi-layer structure with each layer containing one or more waveguides. This particular fabrication method is generally applicable to both small and large scale substrates.

U.S. Pat. No. 6,233,388, the disclosure of which is incorporated herein by reference, discloses a polymer optical waveguide and a method of fabricating the same. U.S. Patent Application No. 20070258691, the disclosure of which is incorporated herein by reference, describes methods for fabricating polymer optical waveguides, and polymer optical waveguides themselves wherein at least one of the optical layers is deposited by a two-stage deposition process. In particular, the two-stage deposition process comprises spinning as the second step. Preferably, the polymer optical waveguide comprises a three layer structure comprising a lower cladding layer, a light guiding core layer and an upper cladding layer, supported on a substrate. The process has particular application to the volume production of polymer optical waveguides on large area substrates.

SUMMARY OF THE INVENTION

Principles of the invention provide improved coupling devices to extract light from optical waveguides.

For example, in one embodiment, a coupling device for coupling light with an optical waveguide is provided. The coupling device comprising a mirror formed within an optical waveguide. The mirror comprises a first material, a first reflective end, and a second reflective end. The first material is light conducting and has a first refractive index. The first and second reflective ends reflect and transmit light. The mirror has an axis line.

The coupling device may, for example, extract light from a waveguide in a direction perpendicular to the flow of light within the waveguide. A plurality of coupling devices formed within a waveguide may, for example, provide a line source of light. A plurality of waveguides, each comprising a plurality of coupling devices may, for example, provide a sheet of uniform light useful for a backlight source within a liquid crystal display. Such a backlight source has the advantage of being a thin light source and the advantage of eliminating the need for expensive color filters within the liquid crystal display.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 1 shows an optical coupling device within an optical waveguide according to an exemplary embodiment of the present invention.

FIG. 2 shows the reflection and transmission of light according to an exemplary embodiment of the present invention.

FIG. 4 shows an optical coupling device within an optical waveguide according to an alternate exemplary embodiment of the present invention.

FIG. 5 shows a liquid crystal display according to an exemplary embodiment of the present invention.

DETAILED DESCRIPTION OF THE INVENTION

Figure 3:
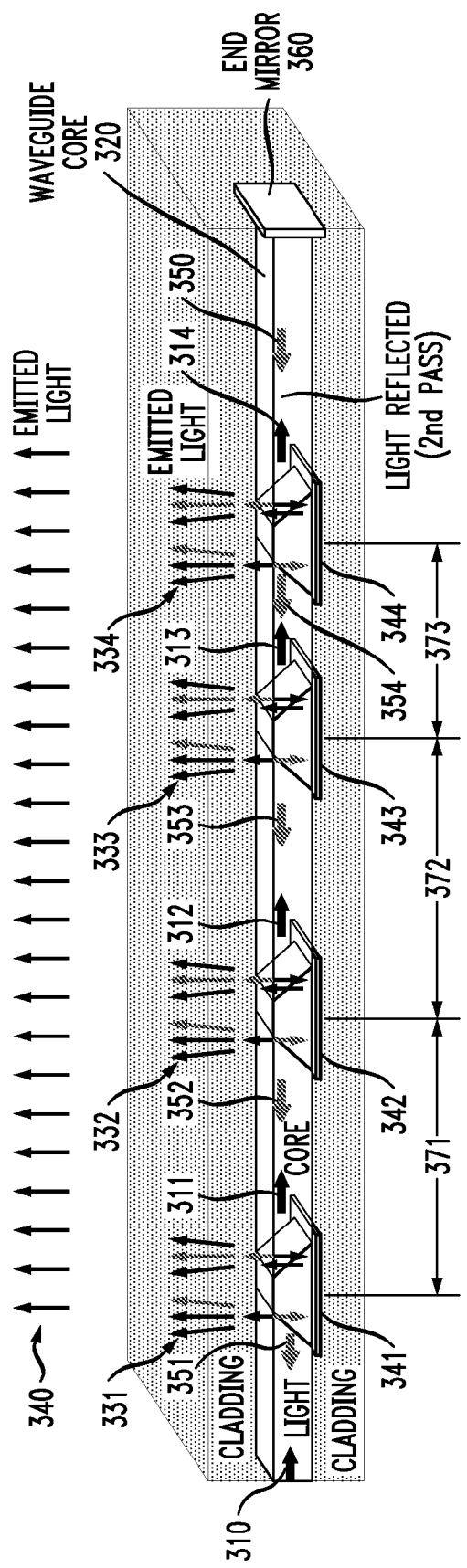
FIG. 3 shows an optical waveguide with a plurality of optical coupling devices and an endpoint light reflector according to an exemplary embodiment of the present invention.

The term transmitted through will be used herein to denote incident light being transmitted through a reflective end shown in FIGS. 1 and 2 as 105a or 105b in substantially the same direction as the direction of the incident light. The term reflected at 90 degrees will be used herein to denote incident light being reflected by a reflective end shown in FIGS. 1 and 2 as 105a or 105b in a direction that is approximately at a 90 degree angle to the incident light. The term reflected at 180 degrees will be used herein to denote incident light being reflected by a reflector shown in FIGS. 1 and 2 as 106 in a direction that is approximately at a 180 degree angle to the incident light. The terms radiated out and coupled out have the same meaning herein. They refer to light that is leaving the waveguide through an optical coupling device. The terms optical coupling device, vertical coupling device and coupling device have the same meaning herein.

The Fresnel equations, deduced by Augustin-Jean Fresnel, describe the behavior of light when moving between media of differing refractive indices. When light moves from a medium of a given refractive index $n_1$ into a second medium with refractive index $n_2$, both reflection and refraction of the light may occur. For angles of incidence where both transmission and reflection of light occur, the greater the difference between $n_1$ and $n_2$, the greater the percentage of incident light that will be reflected and the lower the percentage of incident light that will be transmitted. Expressed in another way, the greater the deviation of the ratio of refractive indices from one, the greater the percentage of incident light that will be reflected and the lower the percentage of incident light that will be transmitted.

In an embodiment of the present invention, light is coupled out of an optical waveguide approximately perpendicular to the direction of light propagation within the optical waveguide. One objective of the invention is to couple a portion of light out of the optical waveguide while the remaining portion of the light travels further along the optical waveguide. A light radiating line is formed by having several of these coupling devices sequentially along a waveguide. A light radiating plane is formed by having a plurality of waveguides in the same plane, each having a plurality of coupling devices. By placing the coupling devices accordingly and adjusting their properties in the right manner, a uniformly radiating surface can be formed. This is important for some illuminating and backlight applications, and example being liquid crystal display backlight devices.

FIG. 1 shows one embodiment 100 of an optical coupling device 110 within a waveguide 120. FIG. 1(a) is cross-sectional view parallel to the direction of light propagation within the waveguide. FIG. 1(b) is a cross-sectional view perpendicular to the direction of light propagation within the waveguide. FIG. 1(c) is a top view. The waveguide is formed on a substrate 101. The waveguide 120 comprises a lower cladding 102, an upper cladding 103 and a core 104. The optical coupling device 110 is formed within the waveguide and comprises Fresnel mirror 105. The optical coupling device 110 further optionally comprises reflector 106. The core 104 is divided by the Fresnel mirror 105 into two core parts 104a and 104b.

In an embodiment of the invention, claddings 102 and 103 are formed from a polymer material, typically but not necessarily, they will be the same polymer material. The core 104 is formed from a different polymer material. The Fresnel mirror 105 is formed from a polymer material different from both that for the claddings 102 and 103, and that for the core 104. These components 102, 103, 104 and 105 are formed from polymer materials that are light conduction and each material has a refractive index. The reflector is formed at least in part from a metal material.

The optical coupling device 110 is formed within an optical waveguide 120 formed upon a substrate 101. The lower cladding 103 is formed upon the substrate 101. The core 104 and Fresnel mirror 105 are formed upon the lower cladding 102. The upper cladding is formed above the lower cladding 102, core 104 and Fresnel mirror 105. The core 104 and Fresnel mirror 105 are covered on the sides as well as the top by the upper cladding 104. Note that in alternate embodiments, the sides of the core 104 and Fresnel mirror 105 may be covered by the lower cladding 103, or partially covered by the lower cladding 103 and partially covered by the upper cladding 104. The reflector 106 is flat and formed within the lower cladding directly below the Fresnel mirror 105, preferably, so that Fresnel mirror 105 is entirely over the reflector 106.

In the embodiment shown in FIG. 1, the core 104 is a cuboid or rectangular prism having rectangular cross-sections. In other embodiments, it may have other cross-sectional shapes other than that shown in the view in FIG. 1(b), such as circular, trapezoidal, or elliptical. The reflector 106 is formed in a plane that is parallel to the bottom of the core 104. In this embodiment, the bottom of the Fresnel mirror 105 and the bottom of the core 104 are in the same plane. Their tops also share a common plane, as do their right sides and their left sides. That is, the core 106 and Fresnel mirror 105 have the same cross-sectional dimensions 104x and 104y in the cross-sectional view shown in FIG. 1(b), and their ends abut with an end of one entirely covering an end of the other. In other embodiments, the cross-sectional dimensions of the Fresnel mirror 105 may be different from those of the core 106. Furthermore, an end of the Fresnel mirror 105 may not entirely cover or be entirely covered by an end of the core 104, that is, their ends may overlap.

In the embodiment shown in FIG. 1a, Fresnel mirror 105 has a trapezoidal shape, having reflective ends 105a and 105b that form 45 degree angles to the bottom of the Fresnel mirror 105 and the bottom of the core 104. An axis line 130 drawn between and intersecting the two reflective ends 105a and 105b and that is parallel to the bottom and sides of the core 104 forms a 45 degree angle with the reflective ends 105a and 105b. This line is referred to herein as the axis line 130.

Each reflective end 105a and 105b of the Fresnel mirror 105 is coupled to a matching end of a core part 104a or 104b respectively. The ends of core parts 104a and 104b are herein called core part ends. Typically, the angled surfaces of the reflective ends 105a and 105b are in direct contact with a corresponding angled surface of a core part end. Thus in the embodiment shown in FIG. 1, a core part end 104a and 104b has a surface that is parallel to and in contact with the coupled reflective end 105a or 105b.

FIG. 2 illustrates the reflection and transmission of light being carried by the optical waveguide and incident upon the Fresnel mirror. A portion of the light will be coupled out of the optical waveguide. An incident light beam 210 is incident from the left side upon the left reflective end 105a of the Fresnel mirror 105. A portion of the light beam is transmitted through the reflective end 105a forming the light beam 214. A portion of the light beam 214 is transmitted through the reflective end 105b forming the light beam 215. Light beam 215 is substantially parallel to incident light beam 210, but may deviate somewhat as detailed below in the description referencing FIG. 3. A portion of incident light beam 210 is reflected at approximately 90 degrees up by reflective end 105a forming light beam 211. Light beam 211 forms part of radiated light 230. A portion of light beam 214 is reflected at approximately 90 degrees down by reflective end 105b forming light beam 212. Light beam 212 is reflected at approximately 180 degrees up forming light beam 213. A portion of light beam 213 is transmitted through reflective end 105b forming part of radiated light 230.

FIG. 2 also illustrates the reflection and transmission of light being carried by the optical waveguide and incident from the right side upon the Fresnel mirror. An incident light beam 220 is incident from the right side upon the right reflective end 105b of the Fresnel mirror 105. A portion of the light beam is transmitted through the reflective end 105b forming the light beam 224. A portion of the light beam 224 is transmitted through the reflective end 105a forming the light beam 225. A portion of incident light beam 220 is reflected at approximately 90 degrees up by reflective end 105b forming light beam 221. Light beam 221 forms part of radiated light 230. Light beam 224 is reflected at approximately 90 degrees down by reflective end 105a forming light beam 222. Light beam 222 is reflected at approximately 180 degrees up by the reflector forming light beam 223. A portion of light beam 223 is transmitted through reflective end 105a forming part of radiated light 230.

FIG. 3 illustrates an optical waveguide 301 comprising four coupling devices 341, 342, 343 and 344, and an endpoint light reflector 360. The structure of the optical waveguide is similar to that described in FIG. 1 and discussed above with reference to FIG. 1 with the exception that it contains four coupling devices and the endpoint reflector. Incident light beam 310 is incident from the left and travels down optical waveguide 301. Incident light beam 310 is incident upon coupling device 341. As described above with reference to FIG. 2, a portion of incident light beam 310 is radiated form the optical waveguide 301 by the coupling device 341. This radiated light is a portion of radiated light 331. A portion of incident light beam 310 is transmitted through coupling device 341 forming light beam 311 which is incident upon coupling device 342. In this manner, light is radiated by coupling devices 341, 342, 343 and 344, as a portion of radiated light 331, 332, 333, and 334. There is residual light transmitted through the last coupling device 344 forming light beam 314. Light beam 314 is incident upon endpoint reflector 360 where it is reflected back in the direction approximately opposite that of light beam 314 and forming light beam 350. Light beam 350 propagates back from right to left through the four coupling devices 341, 342, 343 and 344 radiating light as a portion of radiated light 331, 332, 333, and 334. The radiation of light is again in the manner described with reference to FIG. 2. In this manner, the optical waveguide shown with a plurality of coupling devices and an endpoint reflector forms a line of light radiating points.

Fresnel mirror 341 may cause a small deviation in the direction of prorogated light. Therefore, there may be a small deviation from the direction of incident light beam 310 in the direction of propagated light beam 311. The deviation may increase as propagated light passes through more Fresnel mirrors 342, 343 and 344. Thus, the deviation may progressively increase for light beams 312, 313 and 314. To correct this deviation, in an embodiment with trapezoidal coupling device as shown in FIG. 2, every other coupling device is inverted. In this way, small deviations in the light propagation direction caused by one Fresnel mirror are substantially compensated for by the following Fresnel mirror.

In an embodiment, the intensity of light radiated at each light radiating point corresponding to a coupling device can be controlled by tailoring the refractive index of the material forming each coupling device. That is, each coupling device will be formed from a material that has a different refractive index from the materials forming the other coupling devices. The greater the deviation from unity of the ratio of refraction indices $n_{cd}/n_c$, the greater the amount of light that is radiated by the corresponding coupling device, where $n_{cd}$ is the refractive index of the coupling device material and $n_c$ is the refractive index of the core.

For the radiating optical waveguide shown in FIG. 3, substantially equal intensity of light can be radiated from each coupling device if the ratio of refractive indices deviates further from unity for the materials forming coupling devices as the light progresses in order through coupling devices 341, 342, 343 and 344. Using this approach, a radiating optical waveguide having uniformly spaced optical coupling devices can be formed that has a uniform, or otherwise tailored, light radiation per unit length.

An alternate approach to obtaining substantially uniform, or otherwise tailored, light radiation per unit length of radiating optical waveguide is to adjust the distances between coupling devices, wherein the coupling devices are formed from the same material and therefore have the same refractive index. In this approach to obtain uniform illumination, the distances 371, 372 and 373 get progressively shorter and the coupling devices get progressively closer together.

By having an endpoint reflector 360, the light remaining after passing through all of the optical coupling devices is reflected back and passes through the optical coupling devices again, thereby increasing the amount of light that is radiated form the optical waveguide. The intensity of light decreases as it passes through optical coupling devices. Using the endpoint reflector to provide a second pass of light through the optical coupling devices in a direction opposite to that of the initial pass helps to cause a more uniform radiation of light along the optical waveguide. This improves the uniformity of the vertically emitted light across several, subsequently placed, coupling devices.

FIG. 4 shows an alternate embodiment of an optical coupling device within a waveguide. This embodiment is very similar to the embodiment illustrated in FIG. 1 with the exception of the shape of the Fresnel mirror. Whereas the embodiment shown in FIG. 1 comprises a Fresnel mirror 105 forming a trapezoid, the embodiment shown in FIG. 4 comprises a Fresnel mirror 405 forming a parallelepiped. The embodiment shown in FIG. 4 has reflective ends 405a and 405b that form approximately 45 degree angles to the bottom of the Fresnel mirror 405 and the bottom of the core 404. An axis line 440 drawn between and intersecting the two reflective ends 405a and 405b and that is parallel to the bottom and sides of the core 404 forms an approximately 45 degree angle with the reflective ends 405a and 405b. The embodiment of FIG. 4 also optionally comprises a reflector 406.

The optical path of light incident upon the Fresnel mirror 405 differs from the optical path associated with Fresnel mirror 105. FIG. 4 illustrates the reflection and transmission of light being carried by the optical waveguide and incident upon the Fresnel mirror 405. A portion of the light will be coupled out of the optical waveguide. An incident light beam 410 is incident from the left side upon the left reflective end 405a of the Fresnel mirror 405. A portion of the light beam is transmitted through the reflective end 405a forming the light beam 414. A portion of the light beam 414 is transmitted through the reflective end 405b forming the light beam 415. Light beam 415 is substantially parallel to incident light beam 410. A portion of incident light beam 410 is reflected at approximately 90 degrees up by reflective end 405a forming light beam 411. A portion of light beam 414 is reflected at approximately 90 degrees up by reflective end 405b forming light beam 428. Light beams 411 and 428 form part of radiated light 430.

FIG. 4 also illustrates the reflection and transmission of light being carried by the optical waveguide and incident from the right side upon the Fresnel mirror. An incident light beam 420 is incident from the right side upon the right reflective end 405b of the Fresnel mirror 405. A portion of the light beam is transmitted through the reflective end 405b forming the light beam 424. A portion of the light beam 424 is transmitted through the reflective end 405a forming the light beam 425. Light beam 425 is substantially parallel to incident light beam 420. A portion of incident light beam 420 is reflected at approximately 90 degrees down by reflective end 405b forming light beam 426. Light beam 426 is reflected at approximately 180 degrees up by the reflector forming light beam 427. A portion of light beam 427 is transmitted through reflective end 405b forming part of radiated light 430. Light beam 424 is reflected at approximately 90 degrees down by reflective end 405a forming light beam 422. Light beam 422 is reflected at approximately 180 degrees up by the reflector forming light beam 423. A portion of light beam 423 is transmitted through reflective end 405a forming part of radiated light 430.

The embodiment of an optical waveguide comprising a plurality of trapezoidal shaped coupling devices and an endpoint light reflector as shown in FIG. 3, can be reconfigured to form an embodiment comprising the parallelepiped optical coupling devices illustrated in FIG. 4, or reconfigured to form an embodiment comprising both trapezoidal optical coupling devices and parallelepiped optical coupling devices. All of the aforementioned embodiments are optical waveguides that radiate light at a plurality of points, each point corresponding to an optical coupling device that forms a trapezoid or a parallelepiped. All of these embodiments can adjust the light emitted by tailoring the refractive index of the optical coupling devices and the distances between optical coupling devices.

FIG. 5 illustrates a liquid crystal display (LCD) 500 having a backlight 505 formed from a plurality of optical waveguides 510, 511 and 512 comprising a plurality of optical coupling devices according to embodiments of the invention. The backlight embodiment 505 shown in FIG. 5 is formed from a plurality of optical waveguides 510, 511 and 512 within a waveguide sheet. In the color LCD 500 shown, waveguides carry the different color lights needed for the display, typically red, green and blue. In a black and white LCD (not shown), only white light is necessary.

In the colored LCD, alternating waveguides carry alternating colors as shown in FIG. 5. Although FIG. 5 illustrates waveguides 510, 511 and 512 carrying different colors on different planes, alternate embodiments may have waveguides carrying more than one color on a single plane, all waveguides on a single plane, or waveguides arranged in a different manor on a plurality of planes. In the embodiment shown in FIG. 5, the backlight 505 comprises all upper claddings and all lower claddings, all cores, all optical coupling devices, and optionally all reflectors (not shown). Waveguides cores carrying red, green and blue light are shown and are referred to as red cores 510, green cores 511 and blue cores 512 respectively. Red cores 510, green cores 511 and blue cores 512 comprise a plurality of core parts and a plurality of optical coupling devices. The optical coupling devices are shown in FIG. 5 for the blue cores only and indicated by a "/" mark within the core and by numeral 550. Red cores 510 and green cores 511 also include optical coupling devices but they are not shown in FIG. 5. The optical waveguides 510, 511 and 512 contained within the backlight 505 are formed according to embodiments described above and illustrated in FIGS. 1, 2, 3 and 4. The optical waveguides 510, 511, and 512 contained within the backlight 505 comprise lower and upper claddings, core parts, Fresnel mirrors, and optionally reflectors. They may or may not also include endpoint reflectors.

The LCD backlight of this embodiment radiates light of different colors. In the embodiment shown in FIG. 5, the backlight radiates red light 520, green light 521 and blue light 522. The intensity of light, its intensify per unit waveguide length, and its intensity per unit area can be controlled as described above by tailoring the refractive indices of the Fresnel mirrors and by controlling the spacing between optical coupling devices along waveguides. It can also be controlled by the spacing between waveguides and by the density of waveguides within the backlight.

The LCD 500, besides comprising the backlight 505 further comprises a light diffuser 504 formed above the backlight 505, a lower light polarizer 503 formed above the light diffuser 504, a liquid crystal matrix 502 formed above the lower light polarizer 503, and an upper light polarizer 501 formed above the liquid crystal matrix 502. Although this embodiment has a light diffuser 504, other embodiments may not include this element. If the light diffuser is not included, the lower light polarizer 504 is formed above the backlight 505. The liquid crystal matrix 502 comprises a plurality of liquid crystal elements that affect the transmission of light in response to electrical stimuli. Operation of the diffusing layer 504, the lower polarizing layer 503, the liquid crystal matrix 502, the upper polarizing layer 501, and their combination to form part of an LCD are well known in the art.

Another application for the optical coupling device of this invention is to arrange the optical coupling devices along one or more waveguides to obtain specific shaped light emitting areas to construct a character, a figure, a sign or a display.

When there is a vertical height constraint, the low height of polymer waveguide based sheets is advantageous such as for an LCD or other display.

Polymer optical waveguides can be formed using fabrication techniques well known in the art, such as layer deposition, ultraviolet patterning and wet chemical techniques. Examples of useful layer deposition techniques include but are not limited to doctor blade, spray coat and ink jet techniques. Ultraviolet patterning techniques involve exposing polymer material to ultraviolet radiation. Laser direct writing is particularly useful in fabrication of embodiments involving polymer materials with surfaces at 45 degree angles to the normal, such as the optical waveguide cores, core parts and Fresnel mirrors. Laser direct writing can be used in the one photon absorption process or the two photon absorption process.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A coupling device for coupling light with an optical waveguide, the coupling device comprising:
   a mirror formed within an optical waveguide, the mirror comprising a first material, a first reflective surface, and a second reflective surface, wherein the first reflective surface is substantially opposite to the second reflective surface, wherein the first material is light conducting and has a first refractive index, wherein the first reflective surface reflects and transmits light, wherein the second reflective surface reflects and transmits light, and wherein the mirror has an optical axis line; and
   a reflector comprising a second material, wherein the reflector is approximately parallel to the optical axis line, wherein a line perpendicular to the optical axis line will intersect at least one of the first and second reflective surfaces and intersect the reflector;
   wherein the first reflective surface, the second reflective surface, and the reflector are positioned such that light is collected and propagated out of the coupling device in approximately one direction.

2. The coupling device of claim 1, wherein the mirror is a Fresnel mirror, and wherein the mirror reflects light by Fresnel reflection, and wherein the optical axis line forms an angle of about 45 degrees with the first and the second reflective surfaces.

3. The coupling device of claim 1, wherein the mirror is formed as a trapezoid.

4. The coupling device of claim 1, wherein the first reflective surface is approximately parallel to the second reflective surface.

5. The coupling device of claim 1, wherein the mirror is formed by a method comprising laser direct writing.

6. A coupling device for coupling light with an optical waveguide, the coupling device comprising:
   a mirror formed within an optical waveguide, the mirror comprising a first material, a first reflective end, and a second reflective end, wherein the first material is light conducting and has a first refractive index, wherein the first reflective end reflects and transmits light, wherein the second reflective end reflects and transmits light, and wherein the mirror has an axis line; and
   a reflector comprising a second material, wherein the reflector is approximately parallel to the axis line, wherein a line perpendicular to the axis line will intersect at least one of the first and second reflective ends and intersect the reflector;
   wherein the first material is a first polymer material, and wherein the second material is a metal.

7. The coupling device of claim 1, wherein the mirror is formed to transmit a fraction of incident light rays incident upon the mirror and approximately parallel to the optical axis line, wherein the mirror is formed to reflect a fraction of the incident light rays incident upon the mirror and approximately parallel to the optical axis line, and wherein the reflector is formed to reflect light rays from the mirror and incident upon the reflector.

8. A coupling device for coupling light with an optical waveguide, the coupling device comprising:
- a mirror formed within an optical waveguide, the mirror comprising a first material, a first reflective end, and a second reflective end, wherein the first material is light conducting and has a first refractive index, wherein the first reflective end reflects and transmits light, wherein the second reflective end reflects and transmits light, and wherein the mirror has an axis line; and
- a reflector comprising a second material, wherein the reflector is approximately parallel to the axis line, wherein a line perpendicular to the axis line will intersect at least one of the first and second reflective ends and intersect the reflector;
- a first cladding comprising a third material having a second refractive index;
- a second cladding comprising a fourth material having a third refractive index, wherein the second cladding is formed above the first cladding;
- a core comprising a fifth material, a first core part, and a second core part, wherein the first core part comprises a first core part end, wherein the second core part comprises a second core part end, wherein the core is formed within at least one of the first or second claddings, and wherein the fifth material has a fourth refractive index;
- wherein the first core part end is approximately parallel to the first reflective end, wherein the first core part end is coupled to the first reflective end, wherein the second core part end is approximately parallel to the second reflective end, wherein the second core part end is coupled to the second reflective end, and wherein the fourth refractive index is greater than the second and third refractive indices.

9. The coupling device of claim 8, wherein the first refractive index is greater than the fourth refractive index.

10. The coupling device of claim 8, wherein the first refractive index is less than the fourth refractive index.

11. The coupling device of claim 8, wherein the first material is a first polymer material, wherein the second material is a metal, wherein the third material is a second polymer material, wherein the fourth material is a third polymer material, and wherein the fifth material is a fourth polymer material.

12. A light source device comprising:
- at least one light coupling core device comprising at least one mirror, wherein the at least one mirror comprises a first material having a first refractive index, wherein the at least one mirror has two reflective ends for reflecting and transmitting light, and wherein the at least one mirror has an axis line;
- at least one core part, wherein the at least one core part is formed from a second material, wherein the second material has a second refractive index, wherein the at least one core part has a core part end, and wherein the core part end is coupled to one of the reflective ends, wherein the core part end is approximately parallel to one of the reflective ends; and
- a cladding layer comprising a third material having a third refractive index, wherein the at least one core part is formed within the cladding layer, and wherein the second refractive index is greater than the third refractive index;
- wherein the at least one light coupling core device further comprises at least one reflector, wherein the at least one reflector comprises a fourth material, wherein the at least one reflector is approximately parallel to the axis line, and wherein a line perpendicular to the axis line will intersect one of the reflective ends and intersect one of the at least one reflector,
- further wherein the two reflective ends of the mirror and the at least one reflector are positioned such that light is collected and propagated out of the light coupling core device in approximately one direction.

13. A light source device comprising:
- at least one light coupling core device comprising at least one mirror wherein the at least one mirror comprises a first material having a first refractive index, wherein the at least one mirror has two reflective ends for reflecting and transmitting light, and wherein the at least one mirror has an axis line;
- at least one core part, wherein the at least one core part is formed from a second material, wherein the second material has a second refractive index, wherein the at least one core part has a core part end, and wherein the core part end is coupled to one of the reflective ends, wherein the core part end is approximately parallel to one of the reflective ends; and
- a cladding layer comprising a third material having a third refractive index, wherein the at least one core part is formed within the cladding layer, and wherein the second refractive index is greater than the third refractive index;
- a lower light polarizer formed above the cladding layer;
- a liquid crystal matrix formed above the lower light polarizer, wherein the liquid crystal matrix comprises a plurality of liquid crystal elements, wherein the plurality of liquid crystal elements effects the transmission of light in response to electrical stimuli; and
- an upper light polarizer formed above the liquid crystal matrix.

14. The light source device of claim 12, wherein the at least one mirror is a Fresnel mirror, and wherein the at least one mirror reflects light by Fresnel reflection, and wherein the axis line forms an angle of about 45 degrees with the reflective ends.

* * * * *